G. R. WADSWORTH.
FOOTBOARD VENTILATION FOR MOTOR VEHICLES.
APPLICATION FILED NOV. 8, 1911.

1,094,501.

Patented Apr. 28, 1914.
2 SHEETS—SHEET 1.

Witnesses:
E. B. Gilchrist
H. R. Sullivan.

Inventor
George R. Wadsworth
by Thurston & Kwis
Attys.

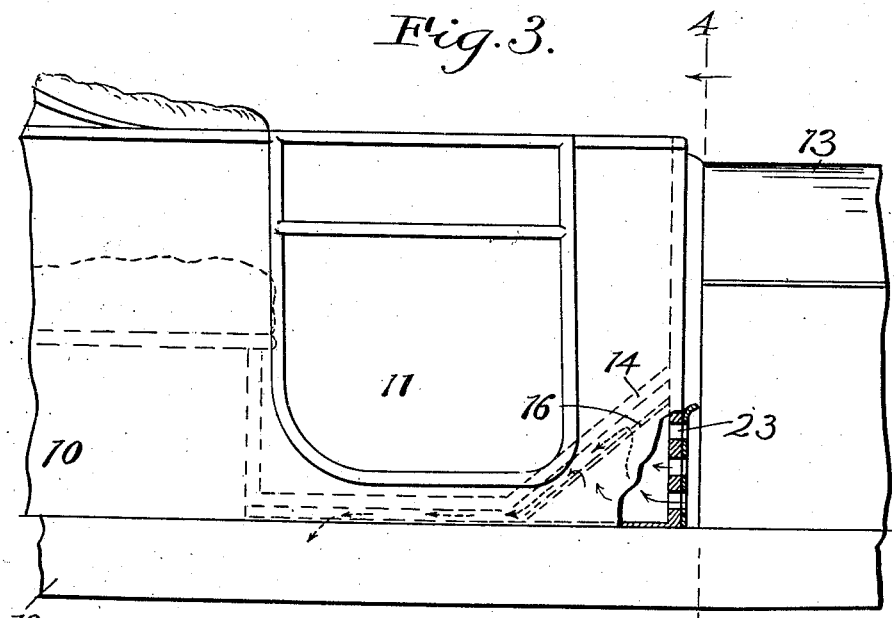
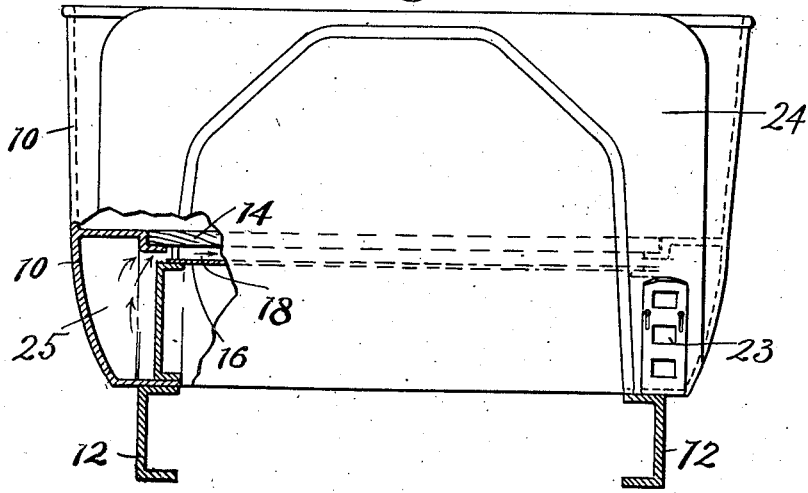

UNITED STATES PATENT OFFICE.

GEORGE R. WADSWORTH, OF CLEVELAND, OHIO, ASSIGNOR TO THE PEERLESS MOTOR CAR COMPANY, OF CLEVELAND, OHIO, A CORPORATION OF OHIO.

FOOTBOARD VENTILATION FOR MOTOR-VEHICLES.

1,094,501.  Specification of Letters Patent.  Patented Apr. 28, 1914.

Application filed November 8, 1911. Serial No. 659,102.

*To all whom it may concern:*

Be it known that I, GEORGE R. WADSWORTH, a citizen of the United States, residing at Cleveland, in the county of Cuyahoga and State of Ohio, have invented a certain new and useful Improvement in Footboard Ventilation for Motor-Vehicles, of which the following is a full, clear, and exact description.

This invention relates to motor vehicles and particularly to those propelled by internal combustion engines.

Nearly all motor vehicles of the type above stated become more or less hot along the footboard and bottom of the body due to the heat which is radiated from the engine and drifts back beneath the footboard and the car body, but in a machine having a body open at the sides opposite the footboard, the heating of the latter is not excessive for the reason that when the car is in motion, there is always a good circulation of air over the footboard. However, in machines having fore doors or other types of closed bodies, such as the torpedo type, this circulation of air over the footboard is prevented, and the latter becomes excessively and uncomfortably hot, particularly in warm weather.

It is the object of the present invention to prevent the heating of the footboard, by heat from the engine, and this I attain by causing a circulation of cool air to be maintained along the bottom of the footboard.

I consider it within the scope of my invention to cool the footboard in a variety of ways, but I prefer to create the cooling circulation of air by the movement of the machine, which I provide with one or more air receiving chambers or ventilating openings into which air rushes when the car is in motion, and is then directed back along the footboard through a suitable air space so as to produce the desired results.

Figure 1:
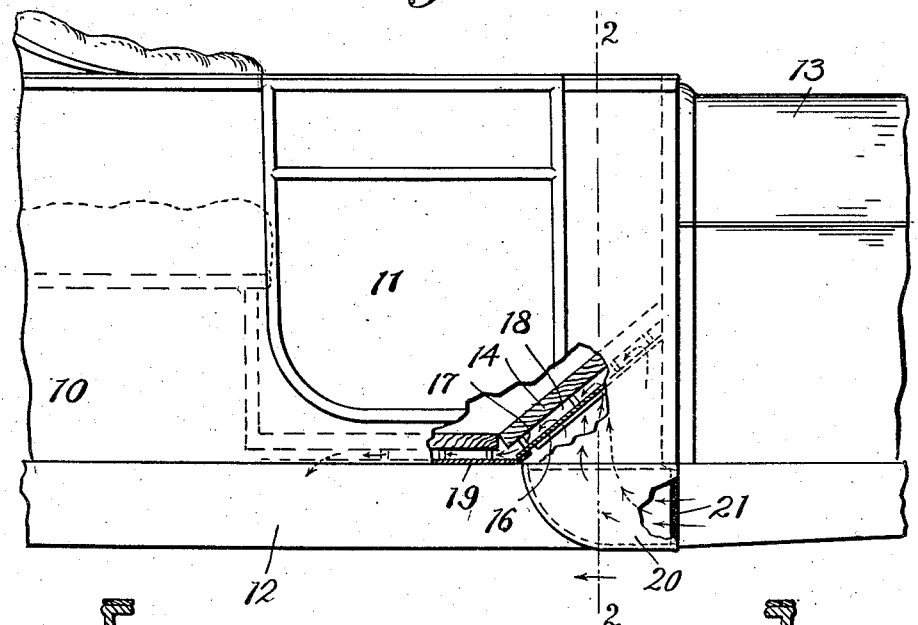
Figure 2:
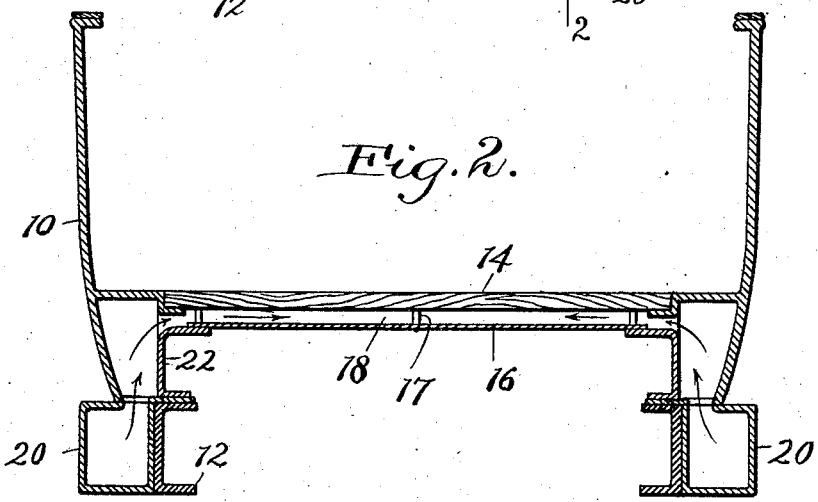

In the drawings, I have illustrated two slightly different ways of accomplishing the result by the method above stated, and in the drawings Figure 1 is a side view of a portion of a car equipped with one form of my invention, portions being broken away and in section; Fig. 2 is a sectional view of the same, substantially along the line 2—2 of Fig. 1, looking in the direction indicated by the arrow; Fig. 3 is a view similar to Fig. 1 showing a modification wherein the ventilator or openings for the admission of cooling air currents are in the dash; Fig. 4 is a sectional view substantially along the line 4—4 of Fig. 3, looking in the direction indicated by the arrows,—portions being broken away.

Referring now to the drawings, it will be seen that the car includes a body 10 having fore doors 11, the body being mounted upon a frame 12. At the front of the body is the hood 13 which incloses the internal combustion engine, not shown. All these parts may be of the usual or any preferred construction, and I do not consider it necessary to illustrate or describe them further.

The car is provided with a footboard 14 which is inclined as in the usual construction. This footboard connects onto the forward portion of the floor or bottom board 15. Secured to the lower side of the footboard 14 is a plate 16 which is held a predetermined distance from the footboard by spacing members 17, thereby forming along the lower side of the whole of the footboard an air space 19 for the circulation of the cooling air currents. While I do not regard it as essential, I prefer to continue this air space rearwardly for a suitable distance along the bottom board 15. I therefore provide along the lower side of the bottom board, a plate 19 which is similar to and is spaced from the bottom board in the same manner that the plate 16 is spaced from the footboard. These two plates 16 and 19 overlap or match when the footboard is in place, thus providing a continuous air space.

To create the proper circulation through the air space 18, I employ one or more air inlet members or ventilators 20, two being here shown, each of which are provided at the front with an air inlet opening which may be covered with a suitable screen 21 to exclude dirt, dust and the like. One of these air inlet members is employed on each side of the machine, and each is secured, in the present case, to the machine beneath the portions of the body which overhang the frame 12. Just above the air inlet members 20, the overhanging portions of the car body are provided with suitable openings, through which air may pass into the forward portion of the body beneath the footboards. To guide the air to the air space beneath the footboard and bottom board, I employ upright metal guide plates 22 which are located beneath the footboard in the forward portion of the body, these plates being somewhat triangular in shape and forming with the car body chambers or ducts which communicate laterally with the air space 18. The result of this construction is that when the car is in motion, air rushes into the air inlet members 20 and thence passes upwardly into the air space 18 beneath the footboard, and thence passes laterally and downwardly so as to circulate well along the entire lower surface of the same, and out through the rear end of the air space 18. By this method, there is a sufficient circulation of cool air beneath the footboard and bottom board to keep the same in cool condition.

In Figs. 3 and 4, I have shown a slight modification which may be employed in case the body does not overhang the frame as shown in Figs. 1 and 2. In this case, air inlet openings or ventilators 23 suitably screened are provided in the dash 24 above the frame and on opposite sides of the hood. These inlet openings communicate with air chambers 25 which conduct air to the air space beneath the footboard, as first described. With this arrangement, the same effective circulation of air is obtained when the car is in motion as in the construction first described, and the footboard, and if desired or necessary, also a portion of the floor can be maintained in cool condition.

It will be obvious therefore that my invention is susceptible of considerable modification, and I do not desire to be confined to the particular forms shown, but aim in my claims to cover all modifications which do not involve a departure from the spirit and scope of my invention in its broad aspect.

Having thus described my invention, what I claim is:

1. In a motor vehicle of the type having a power plant at the forward end of the vehicle, a body, a hood adapted to inclose the power plant and located in front of the body, a foot-board at the forward part of the body at the rear of the hood, said foot board having associated therewith a cooling air space through which air may sweep rearwardly along the same, and means for conducting cooling air currents to opposite sides of the forward portion of said space, said means having at opposite sides of the hood outside of the same and at the forward portion of the body, forwardly facing air inlet openings.

2. In a motor vehicle, of the type having a power plant at the forward end thereof, a hood in front of said body and adapted to inclose a power plant, a double footboard at the forward portion of the body rearwardly of the hood, said double foot-board comprising upper and lower members with an air space between the same, and open at the rear, and means for conducting cooling air currents to opposite sides of the forward portion of said space, said means having at opposite sides of the hood outside of the same and at the forward portion of the body forwardly facing air inlet openings.

In testimony whereof, I hereunto affix my signature in the presence of two witnesses.

GEORGE R. WADSWORTH.

Witnesses:
H. R. SULLIVAN,
A. F. KWIS.